US007467305B2

(12) United States Patent

Nonaka et al.

(10) Patent No.: US 7,467,305 B2

(45) Date of Patent: Dec. 16, 2008

(54) METHOD OF AND SYSTEM FOR RECORDING AND REPRODUCING INFORMATION DATA

(75) Inventors: Yoshiya Nonaka, Saitama-ken (JP); Hiroaki Shibasaki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 277 days.

(21) Appl. No.: 09/726,564

(22) Filed: Dec. 1, 2000

(65) Prior Publication Data

US 2001/0003517 A1 Jun. 14, 2001

(30) Foreign Application Priority Data

Dec. 8, 1999 (JP) ................................ 11-348782

(51) Int. Cl.
*G06F 12/14* (2006.01)

(52) U.S. Cl. ...................................... 713/193; 380/201

(58) Field of Classification Search ................. 713/193, 713/189; 380/3, 4, 21, 49, 201; 726/26, 726/31
See application file for complete search history.

(56) References Cited

U.S. PATENT DOCUMENTS

| | | | | |
|---|---|---|---|---|
| 5,651,064 | A * | 7/1997 | Newell ........................ | 705/51 |
| 6,574,609 | B1 * | 6/2003 | Downs et al. ................. | 705/50 |

* cited by examiner

*Primary Examiner*—Ellen Tran
(74) *Attorney, Agent, or Firm*—Arent Fox LLP

(57) ABSTRACT

A method and a system are provided for recording/reading information data using a first recording medium and a second recording medium each having its own identification data. The method comprises reading first encrypted information data encrypted in accordance with an identification data of the first recording medium and recorded in said first recording medium; encrypting the first encrypted information data in accordance with an identification data of the second recording medium, so as to produce second encrypted information data; recording the second encrypted information data in the second recording medium; reading the second encrypted information data from the second recording medium and decoding the second encrypted information data in accordance with the identification data of the second recording medium; and restoring the second encrypted information data into the first encrypted information data and recording the information data in the first recording medium.

2 Claims, 8 Drawing Sheets

METHOD OF AND SYSTEM FOR RECORDING AND REPRODUCING INFORMATION DATA

BACKGROUND OF THE INVENTION

The present invention relates to a method of and a system for recording and reproducing information data, which may be suitably used for recording and reproducing information data such as audio music data, video image data and computer program data.

Recently, audio music data, video image data and computer program data are usually transmitted for distribution by way of electronic communication system. Such an information distribution is carried out under a prerequisite that the information data can only be distributed by a legally allowed person or company. Namely, in order to forbid an unlawful copy so as to avoid an economic damage to an original author, there have been a regulation prescribing that once the above information data has been received by one recording-reproducing apparatus, the same information data must not be copied from one recording-reproducing apparatus to another.

However, under the above regulation, there has been the following problem experienced by users who have legally obtained one or more of music data, image data and computer program data.

For example, under the above regulation a user is not allowed to prepare a backup copy for his or her legally obtained one or more of music data, image data and computer program data. As a result, an inconvenience will be unfairly brought about to him or her. Namely, if a user's legally obtained music data, image data or computer program data stored in the HDD (Hard Disc) of his or her personal computer has been accidentally damaged, the user has to again buy the same music data, image data or computer program data. Sometimes, it is even impossible to again obtain the same music data, image data or computer program data (for example, out of stock). In addition, if information data is a computer program, and if the computer program stored in the hard disc of a user's personal computer has become old, it will be impossible to perform a version-up processing on the old computer program.

SUMMARY OF THE INVENTION

It is an object of the present invention to provide an improved method and an improved system for recording and reproducing information data, making it technically and legally possible to prepare a backup copy for a person's legally obtained music data, image data or computer program data.

According to one aspect of the present invention, there is provided a method for recording/reading information data using a first recording medium and a second recording medium each having its own identification data, said method comprising the steps of: reading first encrypted information data encrypted in accordance with an identification data of the first recording medium and recorded in said first recording medium; encrypting the first encrypted information data in accordance with an identification data of the second recording medium, so as to produce second encrypted information data; recording the second encrypted information data in the second recording medium; reading the second encrypted information data from the second recording medium and decoding the second encrypted information data in accordance with the identification data of the second recording medium; and restoring the second encrypted information data into the first encrypted information data and recording the information data in the first recording medium.

In particular, a mutual confirmation is performed between the first recording medium and the second recording medium to confirm whether these recording mediums are formally registered, an encrypted information data is read out from the first recording medium or the second recording medium if the mutual confirmation shows that the first and second recording mediums are formally registered.

According to another aspect of the present invention, there is provided a system for recording/reading information data, wherein first encrypted information data encrypted in accordance with an identification data of a first recording medium is read out from the first recording medium, the first encrypted information data is then recorded in a second recording medium, the system comprising: reading means for reading first encrypted information data from the first recording medium; encrypting means for encrypting the first encrypted information data in accordance with an identification data of the second recording medium so as to produce second encrypted information data; and recording means for recording the second encrypted information data in the second recording medium.

In particular, the reading means comprises: confirmation means for performing a mutual confirmation between the first recording medium and the second recording medium; allowance issuing means for issuing an allowance for reading the first encrypted information data when the confirmation means confirms that the first recording medium and the second recording medium are all formally registered.

According to a further aspect of the present invention, there is provided another system for recording/reading information data, wherein second encrypted information data encrypted in accordance with identification data of a second recording medium is read out from the second recording medium, the second encrypted information data is then recorded in a first recording medium, the system comprising: reading means for reading second encrypted information data from the second recording medium; decoding means for decoding the second encrypted information data in accordance with identification data of the second recording means; and recording means for restoring the second encrypted information data into the first encrypted information data so as to record the information data in the first recording medium.

In particular, the reading means comprises: confirmation means for performing a mutual confirmation between the first recording medium and the second recording medium; allowance issuing means for issuing an allowance for reading the second encrypted information data when the confirmation means confirms that the first recording medium and the second recording medium are all formally registered.

The above objects and features of the present invention will become better understood from the following description with reference to the accompanying drawings.

DETAILED DESCRIPTION OF THE PREFERRED EMBODIMENTS

Figure 1:
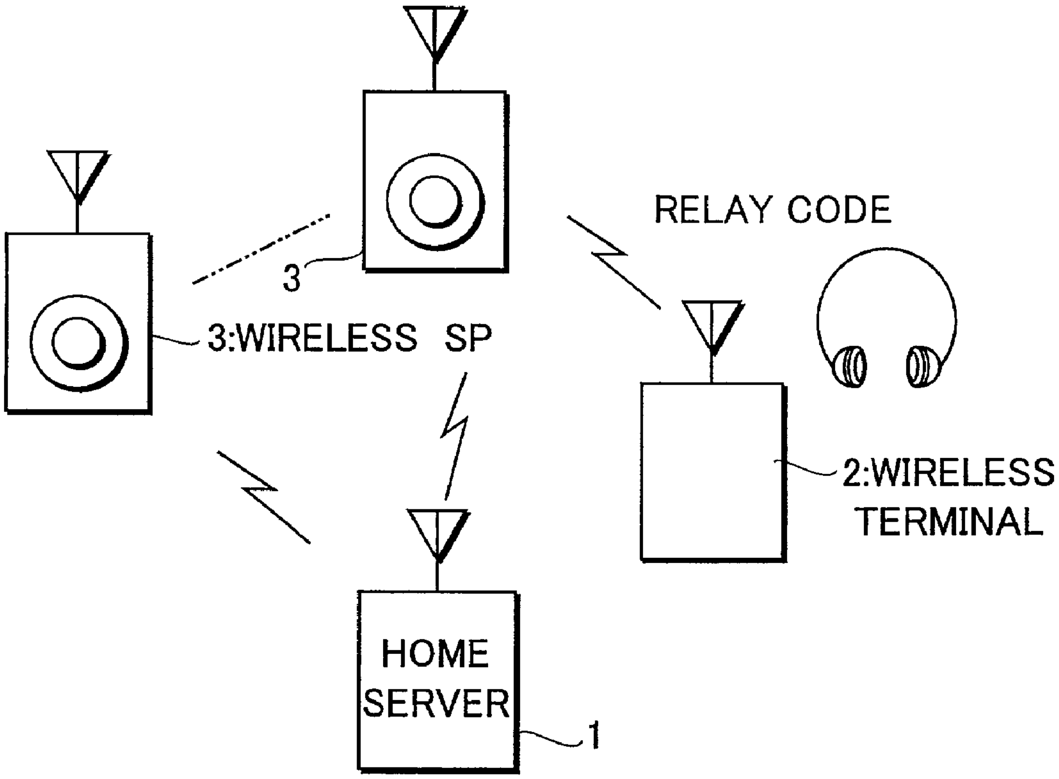
FIG. 1 is an explanatory view showing an information recording and reproducing system formed according to the present invention.

FIG. 1 is an explanatory view showing an information recording and reproducing system formed according to the present invention. As shown in FIG. 1, the information recording and reproducing system comprises a home server 1, a plurality of wireless speakers 3, and a portable wireless terminal 2. Here, the home server 1 serves as a sound source and is the most important part in the system. The plurality of wireless speakers 3 serve as man-machine interfaces and are all connected with the home server 1. In this way, with the movement of the wireless terminal 2, it is allowed to select (for use) one of the plurality of the wireless speakers 3.

Figure 2:
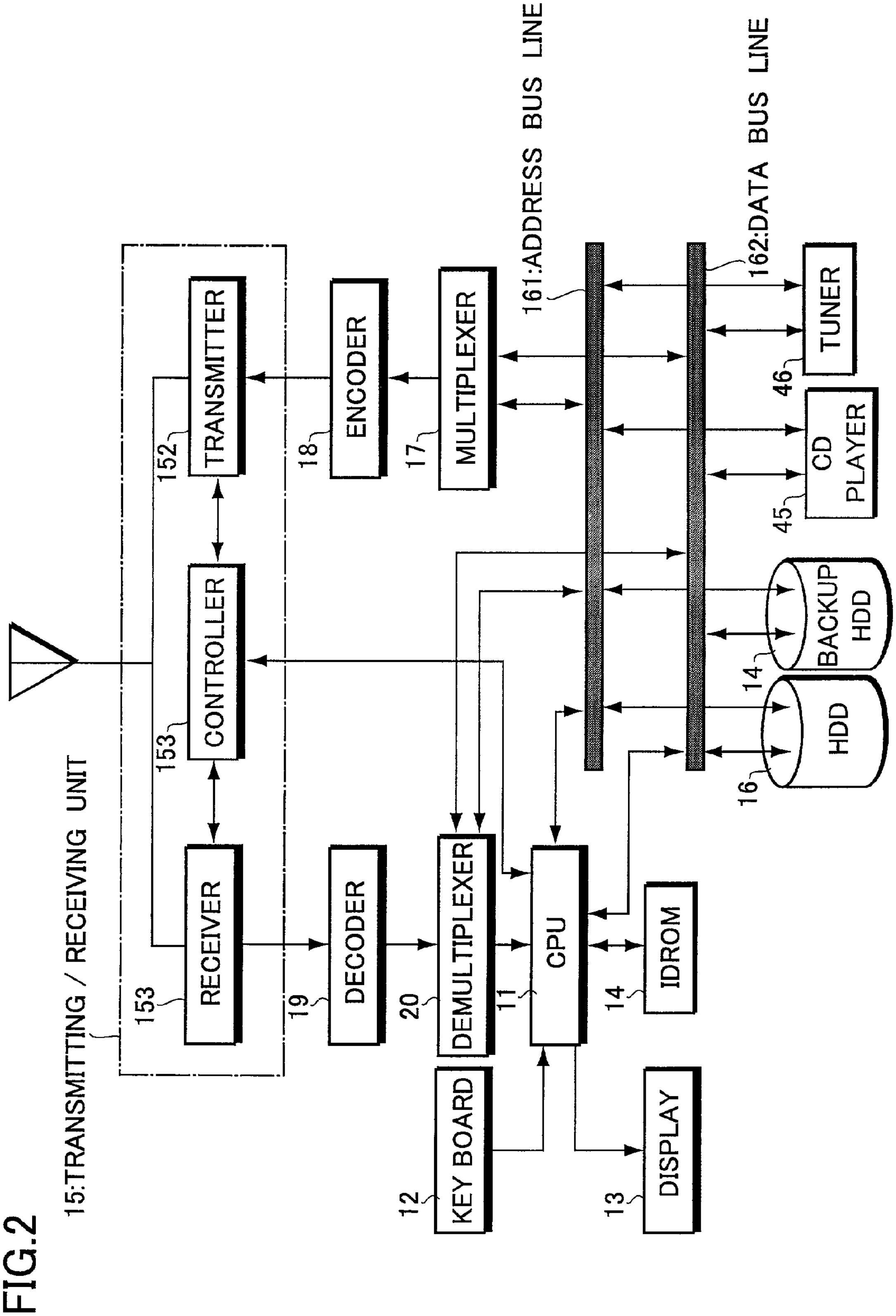
FIG. 2 is a block diagram showing the internal structure of a home server used in the system of FIG. 1.

FIG. 2 is a block diagram showing the internal structure of the home server 1. In FIG. 2, reference numeral 11 represents a CPU serving as a control center for the home server 1. Specifically, the CPU 11 is provided not only for decoding various commands given by a user through a key board 12 to perform a series of predetermined operations, but also for displaying various process results on a display 13 and for performing various controls shown by the blocks (which will be described later in the present specification). Here, any of the controls performed by the CPU 11 will be executed by reading out the programs contained in the server 1. Reference numeral 14 is used to represent IDROM serving as a memory mainly for storing unique identification numbers possessed by the home server 1.

Reference numeral 15 is used to represent a transmitting/receiving unit containing a controller 151, a transmitter 152 and a receiver 153. Under the controls of the CPU 11 and the controller 151 and by means of a multiplexer 17 and an encoder 18, the transmitter 152 operates to modulate an audio signal supplied through address data bus lines 161, 62 from a sound source such as a CD player 45, a tuner 46 and a HDD 16, and to transmit the modulated audio signal to the plurality of wireless speakers 3 (serving as man-machine interfaces). The receiver 153, under the controls of the CPU 11 and the controller 151, receives a signal supplied from the wireless terminal 2 or a wireless speaker 3. The received signal is decoded in a decoder 19, and downloaded (if necessary) on to the HDD 16 through the demultiplexer 20 and the address data bus lines 161, 162.

Reference numeral 44 is a backup HDD which is also connected to the address data bus lines 161, 162. Under the control of the CPU 11, music data may be recorded on or reproduced from the backup HDD 44.

Figure 3:
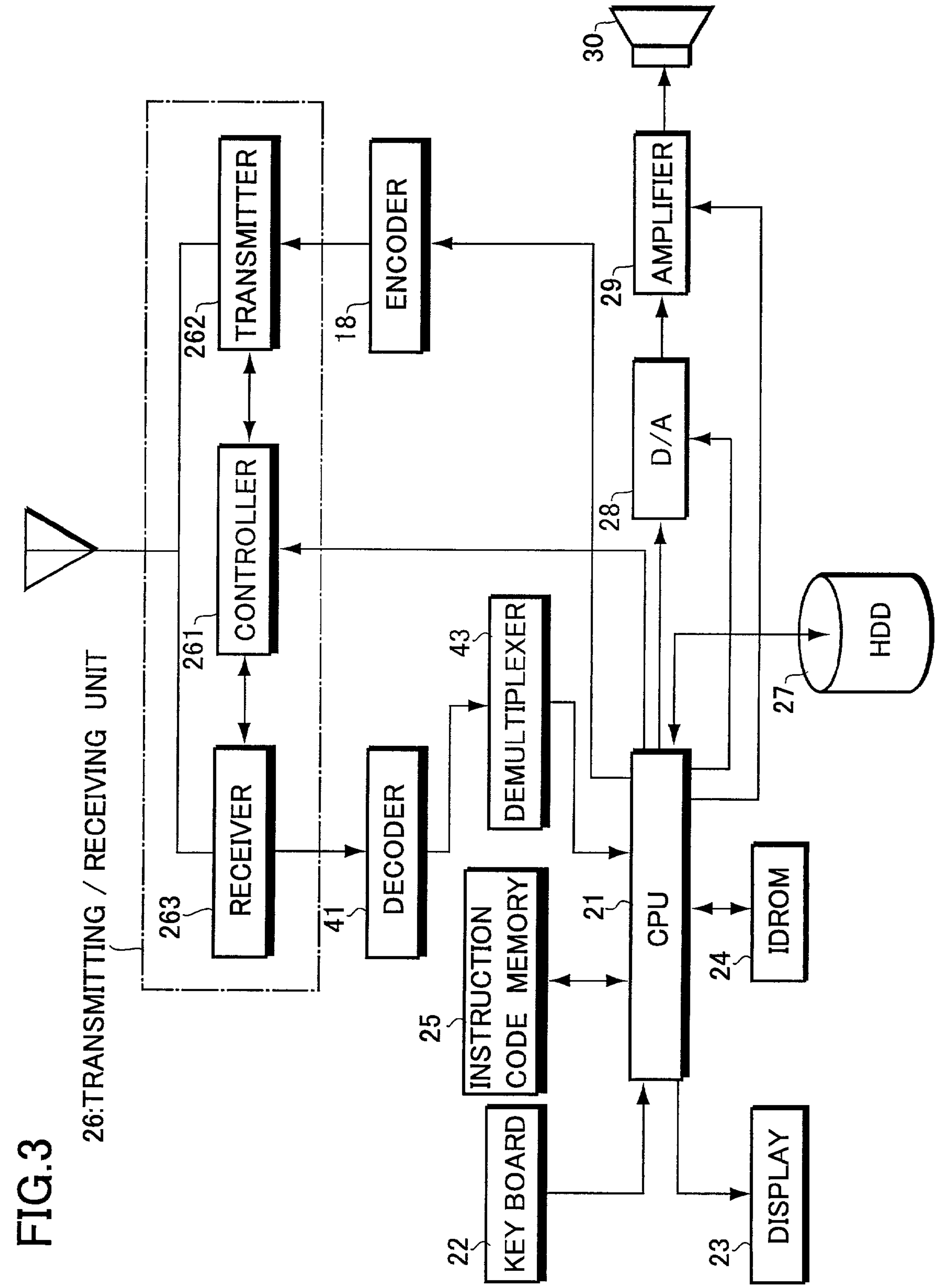
FIG. 3 is a block diagram showing the internal structure of a wireless terminal used in the system of FIG. 1.

FIG. 3 is a block diagram showing the internal structure of the wireless terminal 2. In FIG. 3, reference numeral 21 represents a CPU serving as a control center for the wireless terminal 2. Specifically, the controls performed by the CPU 21 is executed by reading out instruction code representing the reproducing and recording instructions stored in an instruction code memory 25. The CPU 21 is also provided to perform input and output process through a key board 22 and a display 23. On the other hand, the unique identification numbers (ID) of the wireless terminal are stored in an IDROM 24.

Reference numeral 26 is used to represent a transmitting/receiving unit containing a controller 261, a transmitter 262 and a receiver 263. Under the controls of the CPU 21 and the controller 261, the transmitter 262 operates to supply a signal modulated in an encoder 42 to the home server 1 and the wireless speaker 3. The receiver 263, under the controls of the CPU 21 and the controller 261, operates to decode the received signal in a decoder 41, and to supply the signal to the CPU 21 through a demultiplexer 43.

At this time, an audio signal recorded in a HDD 27, under the control of the CPU 21 is converted into an analogue signal in a D/A converter 28, so as to be applied through an amplifier 29 to a portable speaker 30 installed in the wireless terminal 2.

Figure 4:
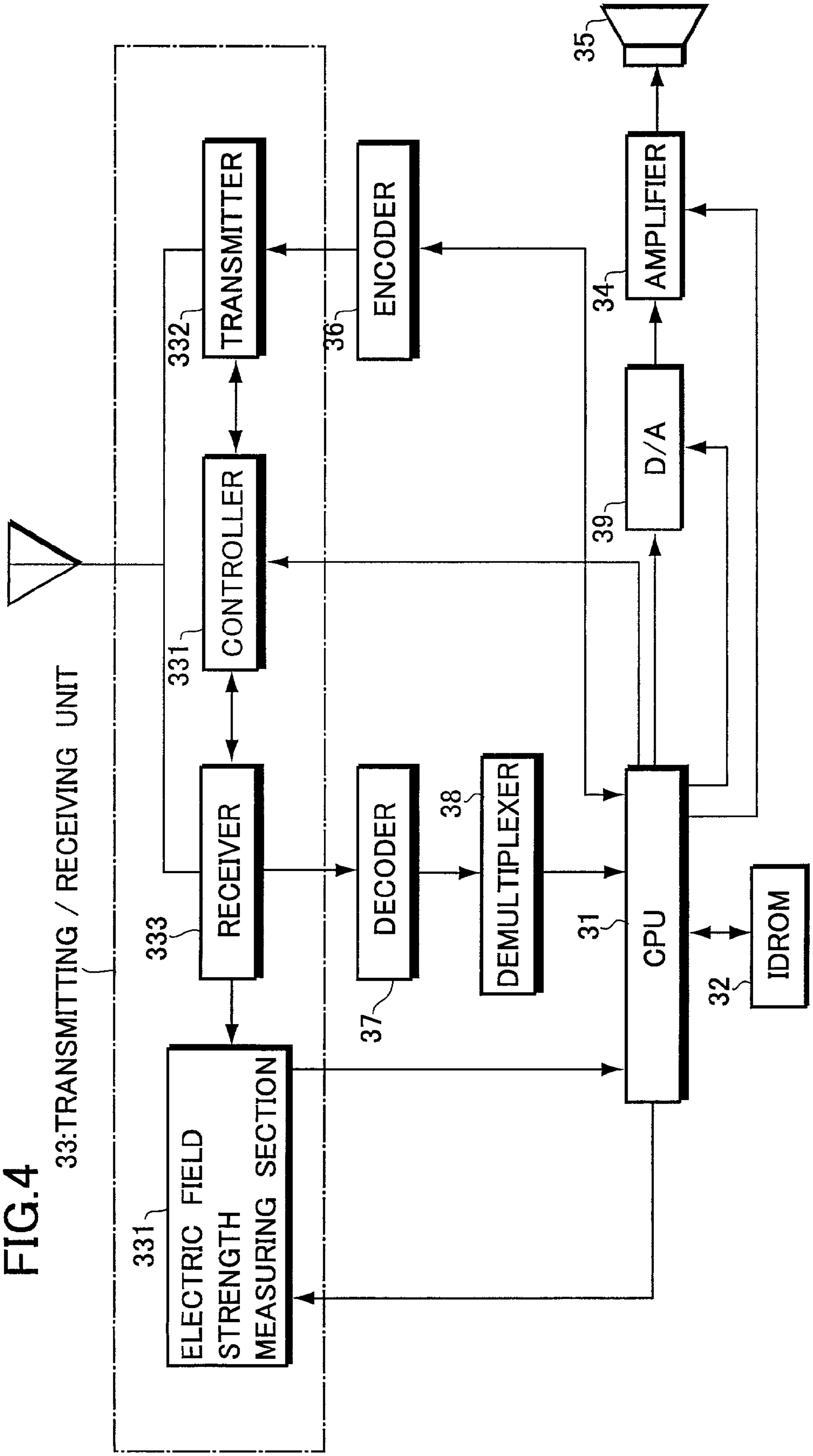
FIG. 4 is a block diagram showing the internal structure of a wireless speaker used in the system of FIG. 1.

FIG. 4 is a block diagram showing the internal structure of a wire-less speaker 3. In FIG. 4, reference numeral 31 represents a CPU serving as a control center for the wireless speaker. Specifically, the controls performed by the CPU 31 is executed in accordance with the programs contained in the wire-less speaker. On the other hand, the unique identification numbers of the wireless speaker 3 are stored in an IDROM 32.

Reference numeral 33 is used to represent a transmitting/receiving unit containing a controller 331, a transmitter 332, a receiver 333 and an electric field strength measuring section 334. The transmitter 332 operates so that a signal generated by the CPU 31 can be modulated in an encoder 36 and then applied to the home server 1 (serving as a parent apparatus) or the wireless terminal 2 (serving as a child apparatus). The receiver 333, under the control of the controller 331, operates to decode an audio signal received from the home server 1 by means of a decoder 37, and to supply the signal to the CPU 31 by way of a demultiplexer 38. The audio signal received by the CPU 31 is converted by a D/A converter 39 into an analogue signal, and then applied through an amplifier 34 to a speaker 35 (serving as a man-machine interface) so as to be output as a desired sound.

The electric field strength measuring section 334, under the control of the CPU 31, operates to measure an electric field strength of a relay code transmitted from the wireless terminal 2. Here, the relay code is transmitted at a weak electric power and is used to determine whether or not a user is in the vicinity of the wireless speaker 3 (for example, an area having a semi-diameter of 50 cm). The receipt result of the relay code is then applied to the CPU 31.

In fact, the home server 1 contains not only the HDD 16 storing the original data and having identification data ID1 but also the backup HDD 44 storing backup data and having identification data ID2. In accordance with the identification data ID1 recorded in the HDD 16, information data encrypted by using a well-known encryption technique such as DES (Data Encryption Standard) and recorded in the HDD 16 may be read out. Then, the encrypted information data which has been read out is further encrypted in accordance with the identification data ID2 recorded in the backup HDD 44, thereby producing backup data and storing the backup data in the backup HDD 44. In this way, if the information data stored in the HDD 16 is accidentally damaged because of some reasons, the same information data may be obtained from the backup HDD 44 by using the identification data ID2.

Each identification data ID is set (in an un-writable state) in a fixed area (FAT: File Allocation Table) of a disc (if it is an HDD such as that described in the above), or is set (as a preformat and in an un-writable state) in a fixed area of an optical disc. The following description is made under a prerequisite that each identification data ID is set in an un-writable state (namely, identification data ID will not disappear unless it is physically destroyed).

Figure 5:
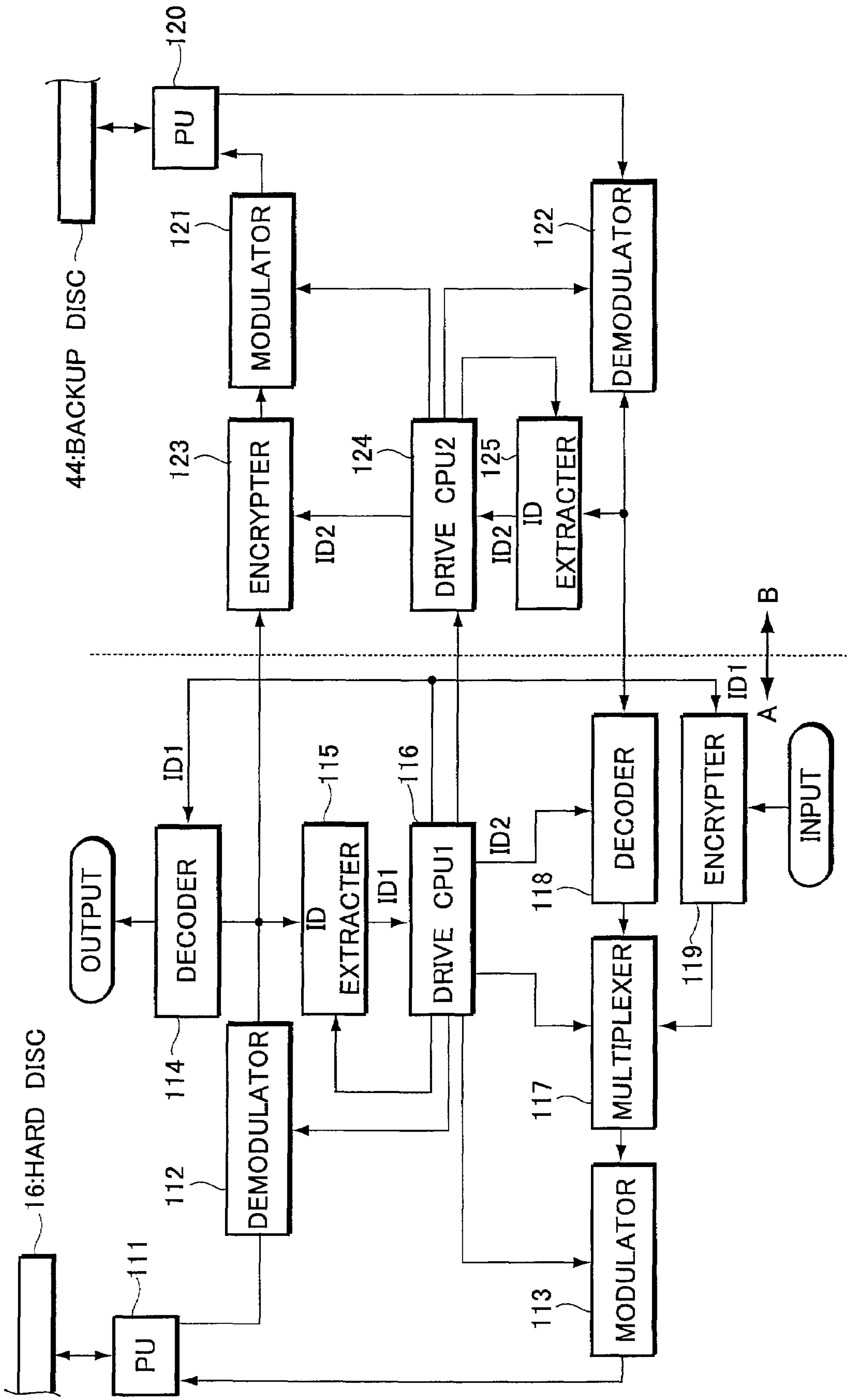
FIG. 5 is a block diagram indicating part of the home server shown in FIG. 1 and FIG. 2.

FIG. 5 is a block diagram showing a circuit containing the HDD 16 and the HDD 44 of the home server 1. In fact, FIG.

5 has been divided into two sections (A, B), with section A representing a peripheral circuit of the HDD 16, and the section B representing a peripheral circuit of the HDD 44.

Referring to FIG. 5, the peripheral circuit of the HDD 16 comprises a pickup unit 111, a demodulator 112, a modulator 113, decoders 114 and 118, an ID extractor 115, a drive CPU 116, a multiplexer 117, and an encrypter 119. The peripheral circuit of the HDD 44 comprises a pickup unit 120, a modulator 121, a demodulator 122, an encrypter 123, a drive CPU 124, and an ID extractor 125.

The pickup unit 111 is a read/write circuit containing a magnetic head capable of reading data from or writing data into the HDD 16. The information data to be written into the HDD 16 may be produced by operating the encrypter 119 to encrypt information data supplied from an external system (the encryption is performed in accordance with the identification data ID of the HDD 16). specifically, the encryption may be effected by at first supplying identification data ID1 (extracted by the extractor 115) through the drive CPU 116 and then supplying the identification data ID1 to the pickup 111 through the multiplexer 117 and the modulator 113, so as to be written into the HDD 16. On the other hand, information data read from the HDD 16 is passed through the demodulator 112 and is then decoded in the decoder 114, so as to be output to a reproducing circuit (not shown) such as a D/A converter of the home server 1.

On the other hand, when the information data recorded in the HDD 16 is to be backup in the HDD 44, the information data is at first read out from the HDD 16 through the pickup 111 and the demodulator 112. Then, the information data is encrypted in the encrypter 123 (included in section B which is the peripheral circuit of the HDD 44). Here, the encryption is performed under the control of the drive CPU 124 and is effected by supplying identification data ID2 (extracted by the extractor 125) through the drive CPU 124, so that the information data read out from the HDD 16 can be encrypted. In this way, the information data encrypted in accordance with the identification data ID1 is further encrypted in accordance with the identification data ID2.

In this way, if the information data recorded in the HDD 16 has been accidentally damaged for some reason, the same data may be obtained from the backup disc 44. At this time, the information data read from the backup disc 44 through the pickup 120 is demodulated in the demodulator 122, and is then applied to the decoder 118 (in section A which is the peripheral circuit of the HDD 16). The decoder 118 operates to decode the encrypted data formed in accordance with the identification data ID2 of the backup HDD 44, thereby separating the identification data ID2, thus applying the information data to the pickup 111 through the multiplexer 117 and the modulator 113 (all in section A which is peripheral circuit of the HDD 16). In this way, the pickup 111 can operate to write the information data (encrypted only in accordance with identification data ID1) in the HDD 16.

In the description given in the above, the blocks shown in FIG. 5 all serve as hardwares, but some of the blocks may be firmwares possessed by the drive CPUs 116 and 124.

The operation of the present invention will be described with reference to FIG. 6 and FIG. 7. Here, FIG. 6A and FIG. 7A represent main routines, while FIG. 6B, FIG. 6C and FIG. 7B represent sub routines, indicating an operation of the drive CPU 124 when performing a backup recording process and an operation of the drive CPU 116 when performing a data restoration recording process.

Figure 6A:
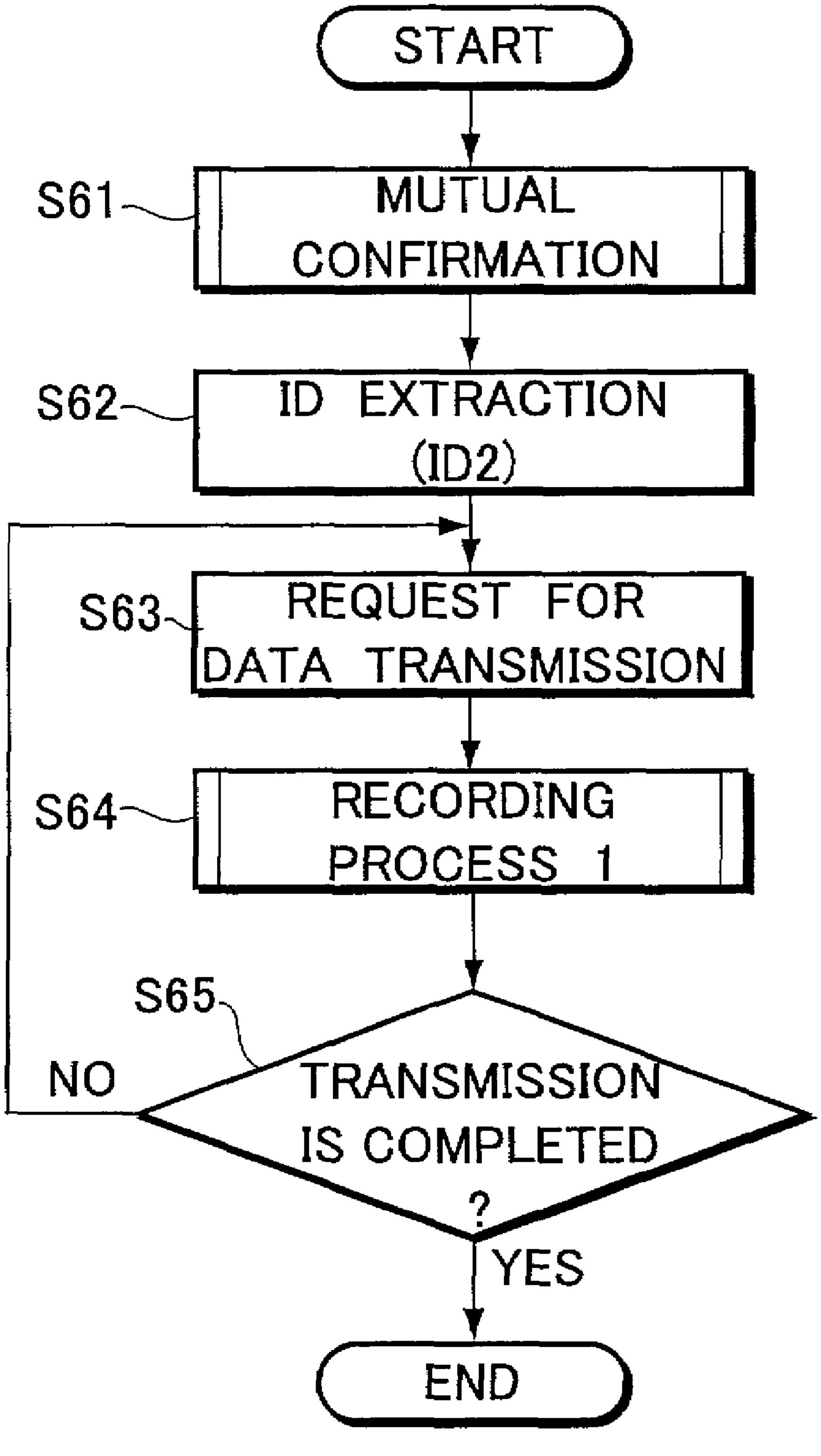
FIG. 6 is a flow chart showing a procedure for carrying out one embodiment of the present invention.
Figure 6B:
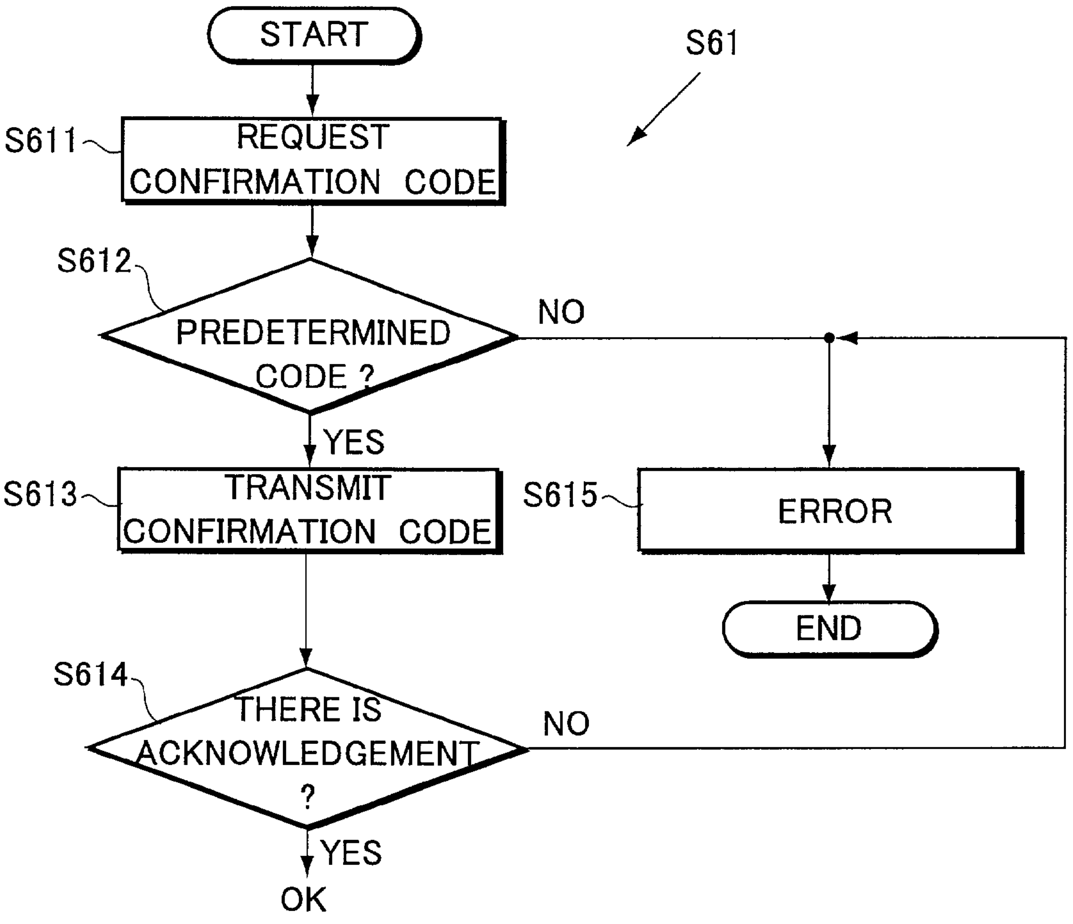
Figure 6C:
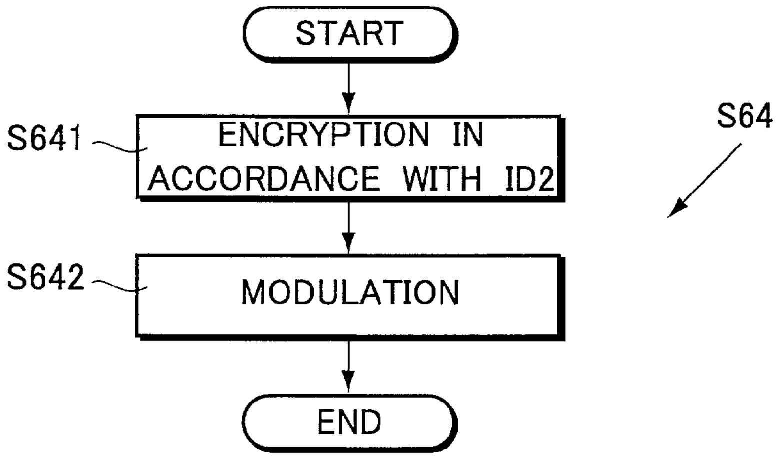
Figure 7A:
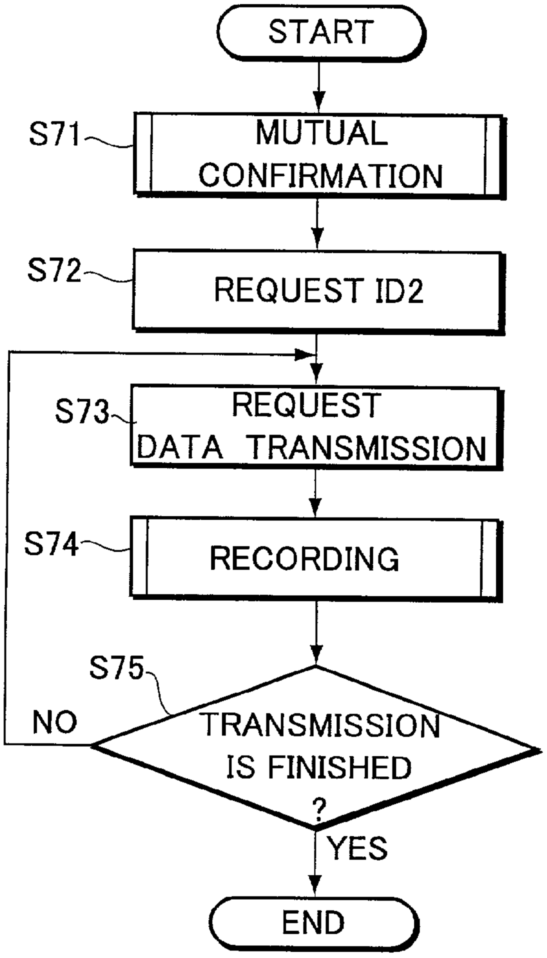
FIG. 7 is a flow chart showing part of the embodiment of the present invention.

Referring to FIG. 6A and FIG. 6B, at first, the drive CPU 124 performs a mutual confirmation with the drive CPU 116 (step S61). At this time, a confirmation code defined in advance for the CPU 116 is requested (step S611). Then, the confirmation code is checked to determine whether or not it is a predetermined code (step S611). If the confirmation code is a predetermined code, another confirmation code defined in advance for the drive CPU 124 is transmitted to the drive CPU 116 (step S613). If an ACK (Acknowledgement) has been obtained as a reply from the drive CPU 116, it is determined that the above confirmation has been successful. On the other hand, if the above confirmation has been a failure, it is determined that an error has occurred (step S615).

Then, the drive CPU 124 operates to extract the identification data ID2 of the backup disc 44 by virtue of the extractor 125 (step S62). Afterwards, a request for data transmission is issued to the drive CPU 116 (step S63) to request the transmission of information data from the HDD 16. Then, the information data transmitted from the HDD 16 is recorded in the backup disc 44 in accordance with a flow chart shown in FIG. 6C. Namely, as shown in FIG. 6C, in accordance with the identification data ID2 fed through the CPU 124, the information data (encrypted in accordance with the identification data ID1) fed from the demodulator 112 is further encrypted in the encrypter 123 (step S641), then modulated in the modulator 121, so as to be written in the backup disc 44 by virtue of the pickup 120.

Afterwards, it is checked whether or not the transmission of desired amount of information data has been completed (step S65). If not, the processes from the step S63 onward are repeated until the completion of the data transmission, thereby completing the backup recording process.

FIG. 7 is a flow chart showing a restoring/recording process. At first, the drive CPU 116 performs a mutual confirmation with the drive CPU 124 (step S71), in the same manner as shown in FIG. 6B. Afterwards, a request for data transmission is issued to the drive CPU 124 to request the transmission of the identification data ID2 of the backup disc 44 (step S72). Then, a request for data transmission from the backup disc 44 is issued (step S73), thereby executing a process for recording the information data transmitted from the backup disc 44 into the HDD 16 (step S74).

Figure 7B:
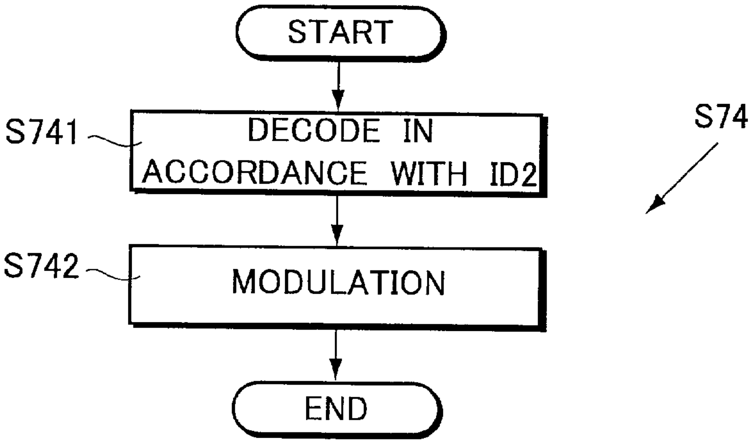

In detail, the recording process is executed in a flow chart shown in FIG. 7B. As shown in FIG. 7B, the drive CPU 116 operates to decode (step 741), by means of the decoder 118 and in accordance with the identification data ID2 obtained in the step S72, the backup data encrypted in accordance with the identification data ID2 of the HDD 44 and fed through the demodulator 122. The decoded backup data is then passed through the multiplexer 17 so as to be modulated in the modulator 113. Afterwards, the modulated backup data is written in the hard disc HDD 16 by means of the pickup 111.

Afterwards, it is checked whether or not the transmission of the desired amount of information data has been completed (step S75). If not, the processes from the step S73 onward are repeated until the completion of the backup data transmission, thereby completing the data restoring/recording process.

As may be understood from the above description, when the information data recorded in the first recording medium 16 is to be backup, the first encrypted data encrypted in accordance with the identification data ID1 of the first recording medium 16 is read out and is then further encrypted in accordance with the identification data ID2 of the second recording medium 44 so as to form the second encrypted data and record the second encrypted data in the second recording medium 44. On the other hand, when the backup data recorded in the second recording medium 44 is to be restored into information data recorded in the first recording medium, the second encrypted data is read out from the second recording medium 44 and decoded in accordance with the identification data ID2 of the second recording medium 44. The decoded second encrypted data is then restored into the first encrypted data, so as to be recorded in the first recording medium 16. In this way, a user is allowed to perform data recording process for the purpose of backup, thereby eliminating any unfair restrict to a lawful user, while at the same time ensuring a lawful protection for an author's copy right.

In this way, with the use of the present invention, when the information data recorded in the first recording medium is to be recorded in the second recording medium (for backup), the information data is at first encrypted in accordance with the identification data of the second recording medium, and then recorded in the second recording medium. Accordingly, the content recorded in the second recording medium may be made different from that recorded in the first recording medium. Therefore, a concept of forbidding an unlawful copy can be maintained exactly, while at the same time allowing a lawful user to perform data recording for the purpose of data backup. in addition, if the information data recorded in the first recording medium is destroyed accidentally for some reasons, the same data can be restored in accordance with the identification data ID2 of the second recording medium and can be recorded back into the first recording medium. Moreover, since each recording process is performed only after a mutual confirmation has been completed, it is sure to prevent any unlawful copy.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method for making a legal backup of a first recording medium using a second recording medium each having its own identification data, said method comprising:

each recording medium has identification data in a fixed area of the recording medium that cannot be altered unless the recording medium is destroyed;

mutual confirmation is performed between the first recording medium and the second recording medium to confirm whether these recording mediums are formally registered, an encrypted information data is read out from the first recording medium or the second recording medium if the mutual confirmation shows that the first and second recording mediums are formally registered;

reading first encrypted information data encrypted in accordance with an identification data of the first recording medium and recorded in said first recording medium;

encrypting the first encrypted information data in accordance with an identification data of the second recording medium, wherein the identification data of the second recording medium is different from the identification data of the first recording medium so as to produce second encrypted information data;

recording the second encrypted information data in the second recording medium;

when the first encrypted information recorded in the first recording medium is damaged, reading the second encrypted information data from the second recording medium and decoding the second encrypted information data in accordance with the identification data of the second recording medium; and wherein the second encrypted information data is decoded in accordance with the identification information data of the second recording medium so as to be restored into the first encrypted information data without being again encrypted in accordance with the identification data of the first recording medium whereby the second encrypted information data recorded in the second recording medium is different from the first encrypted information data recorded in the first recording medium.

2. A system for making a legal backup of a first recording medium using a second recording medium, said system comprising:

each recording medium has identification data in a fixed area of the recording medium that can not be altered unless the recording medium is destroyed;

confirmation means for performing a mutual conformation between the first recording medium and the second recording medium to confirm whether these recording mediums are formally registered;

allowance means allowing an encrypted information to be read from the first recording medium or the second recording medium if said mutual conformation shows that the first and second recording mediums are formally registered;

first reading means which, when an allowance is issued from the allowance means, reads out first encrypted information encrypted in accordance with identification data of the first recording medium and stored in the first recording medium;

encryption means for encrypting the first encrypted information which has been read out, in accordance with identification data of the second recording medium different from the identification data of the first recording medium, thereby generating second encrypted information different from the first encrypted information;

first recording means for recording the second encrypted information in the second recording medium;

second reading means for reading out the second encrypted information recorded in the second recording medium, when the first encrypted information recorded in the first recording medium has been damaged;

decoding means for decoding the read-out second encrypted information in accordance with the identification data recorded in the second recording medium; and second recording means for recording, in the first recording medium, the first encrypted information restored by decoding the second encrypted information without being again encrypted in accordance with the identification data recorded in the first recording medium.

* * * * *